(No Model.)

G. B. HILL.
NUT LOCK.

No. 252,462.  Patented Jan. 17, 1882.

Witnesses:
J. W. Garner
H. J. Osgood.

Inventor:
George B. Hill
Manuel A. Shorr
Attorney.

UNITED STATES PATENT OFFICE.

GEORGE B. HILL, OF DETROIT, MICHIGAN.

NUT-LOCK.

SPECIFICATION forming part of Letters Patent No. 252,462, dated January 17, 1882.

Application filed December 5, 1881. (No model.)

*To all whom it may concern:*

Be it known that I, GEORGE B. HILL, a citizen of the United States, residing at Detroit, in the county of Wayne and State of Michigan, have invented certain new and useful Improvements in Nut-Locks, of which the following is a specification, reference being had therein to the accompanying drawings.

This invention has relation to that class of nut-locking devices wherein a part of the metal of the nut is forced into intimate contact with the thread of the bolt for the purpose of forming a lock; and the invention consists in the construction and novel arrangement of the punch-recess in the face of the nut between the wrench-seat and the threaded interior, said recess having an outer bevel or guide wall to insure the proper action of the punch, all as hereinafter set forth, and especially pointed out in the claim appended.

Figure 1:
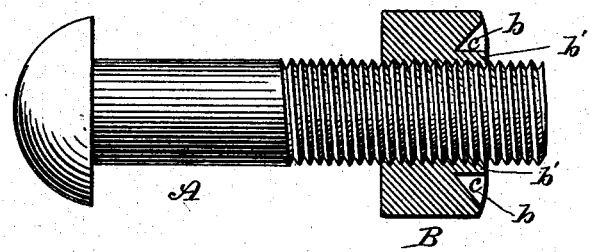
Figure 2:
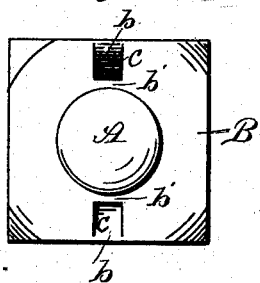
Figure 3:
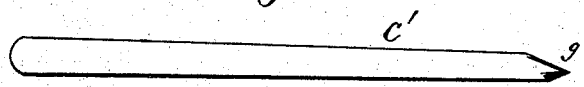

In the accompanying drawings, Figures 1, 2, and 3, the letter A designates an ordinary threaded bolt, and B the nut thereon. This nut is formed in the manufacture with a recess, $c$, in its face, a toothed die being employed for this purpose. The recess $c$ is made with its inner wall, $b'$, near the threaded interior, and sufficiently thin to yield under the action of a punch. The outer wall, $b$, of the recess is a beveled or guide wall, and serves to guide the punch in its action upon the inner wall. Being made in the face of the nut, this recess is designed not to interfere with the strength of the nut, either with regard to its interior or to its outer portion or wrench-seat. These nuts may be pressed hot or cold out of common plate-iron, and can therefore be cheaply made, the cost of manufacture being no greater than that of the ordinary pressed iron nut.

When the nut is put in use it is locked on the bolt by setting its inner wall, $b'$, up with a punch, $c'$, and thereby forcing a portion of its interior threaded wall into intimate contact with the threads of the bolt. The working end $g$ of the punch is usually conically pointed, and designed to be so directed in its action as to crowd the thread of the nut somewhat obliquely as well as inwardly. The lock thus formed will hold the nut in place on the bolt under any ordinary circumstances, and when necessary the bolt can be loosened or taken off by using a wrench.

I am aware that it is not new to form a recess in the side wall or wrench-seat of a nut for the introduction of a punch, and I do not claim such a device.

Having described this invention, what I claim, and desire to secure by Letters Patent, is—

The pressed nut herein described, having a punch-recess, $c$, in its face between its threaded interior and its wrench-seat, said recess being formed with an inner thin wall, $b'$, near the threaded interior, and an outer beveled or guide wall, $b$, substantially as specified.

In testimony whereof I affix my signature in presence of two witnesses.

GEORGE B. HILL.

Witnesses:
W. J. OSGOOD,
H. W. UPPERMAN.